United States Patent
Kishida

(10) Patent No.: US 7,579,981 B2
(45) Date of Patent: *Aug. 25, 2009

(54) SIGNAL PROCESSING METHOD FOR FM-CW RADAR

(75) Inventor: Masayuki Kishida, Kobe (JP)

(73) Assignee: Fujitsu Ten Limited, Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,577

(22) Filed: Jan. 2, 2008

(65) Prior Publication Data

US 2008/0117095 A1 May 22, 2008

Related U.S. Application Data

(63) Continuation of application No. 10/584,178, filed as application No. PCT/JP2004/019698 on Dec. 22, 2004, now Pat. No. 7,391,361.

(30) Foreign Application Priority Data

Dec. 26, 2003 (JP) .............................. 2003-435084

(51) Int. Cl.
G01S 13/34 (2006.01)
G01S 13/58 (2006.01)

(52) U.S. Cl. .................... 342/109; 342/70; 342/192; 342/196

(58) Field of Classification Search .................. 342/109
See application file for complete search history.

(56) References Cited

U.S. PATENT DOCUMENTS 6,137,435 A 10/2000 Kai (Continued)

FOREIGN PATENT DOCUMENTS

JP 5-142338 6/1993

(Continued)

OTHER PUBLICATIONS

International Search Report, dated Mar. 1, 2005, Corresponding to PCT/JP2004/019698.

(Continued)

*Primary Examiner*—Thomas H Tarcza
*Assistant Examiner*—Matthew M Barker
(74) *Attorney, Agent, or Firm*—Christie, Parker & Hale, LLP

(57) ABSTRACT

Disclosed is a signal processing method for an FM-CW radar that can accurately detect the relative distance, relative velocity, etc. with respect to a target approaching or receding at a high relative velocity, wherein predicted values for peak frequencies currently detected in upsweep and downsweep sections are computed from the previously detected relative distance and relative velocity, and it is determined whether any of the predicted values exceeds a detection frequency range and, if there is a peak frequency that exceeds the detection frequency range, the frequency is folded and the folded frequency is taken as one of the predicted values, the method then proceeding to search the currently detected peak frequencies to determine whether there are upsweep and downsweep peak frequencies approximately equal to the predicted values and, if such upsweep and downsweep peak frequency are found, the peak frequency approximately equal to the folded predicted value is folded and the folded peak frequency is used.

3 Claims, 10 Drawing Sheets

U.S. PATENT DOCUMENTS

| | | |
|---|---|---|
| 6,646,589 B2 | 11/2003 | Natsume |
| 2002/0180635 A1 | 12/2002 | Shono |
| 2003/0001771 A1 | 1/2003 | Ono |
| 2003/0122702 A1 | 7/2003 | Kishida et al. |
| 2004/0032361 A1* | 2/2004 | Kirscht .................. 342/25 |
| 2004/0051660 A1 | 3/2004 | Kai |
| 2004/0125010 A1* | 7/2004 | Natsume et al. ............. 342/70 |
| 2005/0017891 A1 | 1/2005 | Kuroda et al. |
| 2006/0181448 A1 | 8/2006 | Natsume et al. |

FOREIGN PATENT DOCUMENTS

| | | |
|---|---|---|
| JP | 06-70673 | 3/1994 |
| JP | 11-271426 | 10/1999 |
| JP | 2000-321352 | 11/2000 |
| JP | 2003-315446 | 11/2003 |
| JP | 2003-329767 | 11/2003 |
| JP | 2004-69340 | 3/2004 |

OTHER PUBLICATIONS

Patent Abstract of Japan, Publication No. 05142338 A, Published on Jun. 8, 1993, in the name of Kamimura, et al.

Patent Abstract of Japan, Publication No. 2000321352 A, Published on Nov. 24, 2000, in the name of Kai.

Patent Abstract of Japan, Publication No. 2003315446 A, Published on Nov. 6, 2003, in the name of Kai.

Patent Abstract of Japan, Publication No. 2003329767 A, Published on Nov. 19, 2003, in the name of Yano, et al.

Patent Abstract of Japan, Publication No. 2004069340 A, Published on Mar. 4, 2004, in the name of Mitsumoto, et al.

Patent Abstract of Japan, Publication No. 06-070673 dated Mar. 15, 1994, in the name of Hiroyuki Takano et al.

Patent Abstract of Japan, Publication No. 11-271426 dated Oct. 8, 1999, in the name of Masayuki Kishida.

* cited by examiner

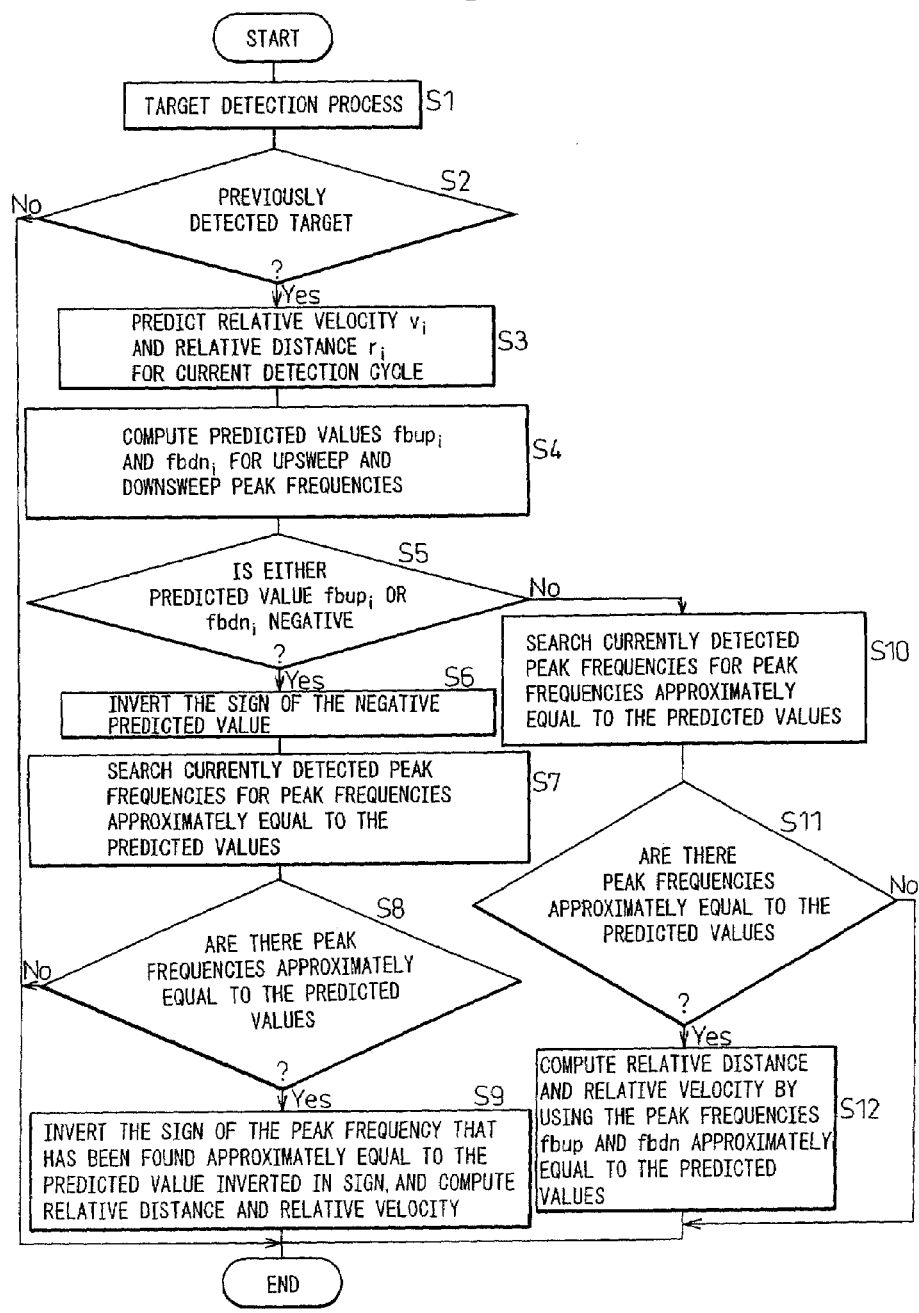

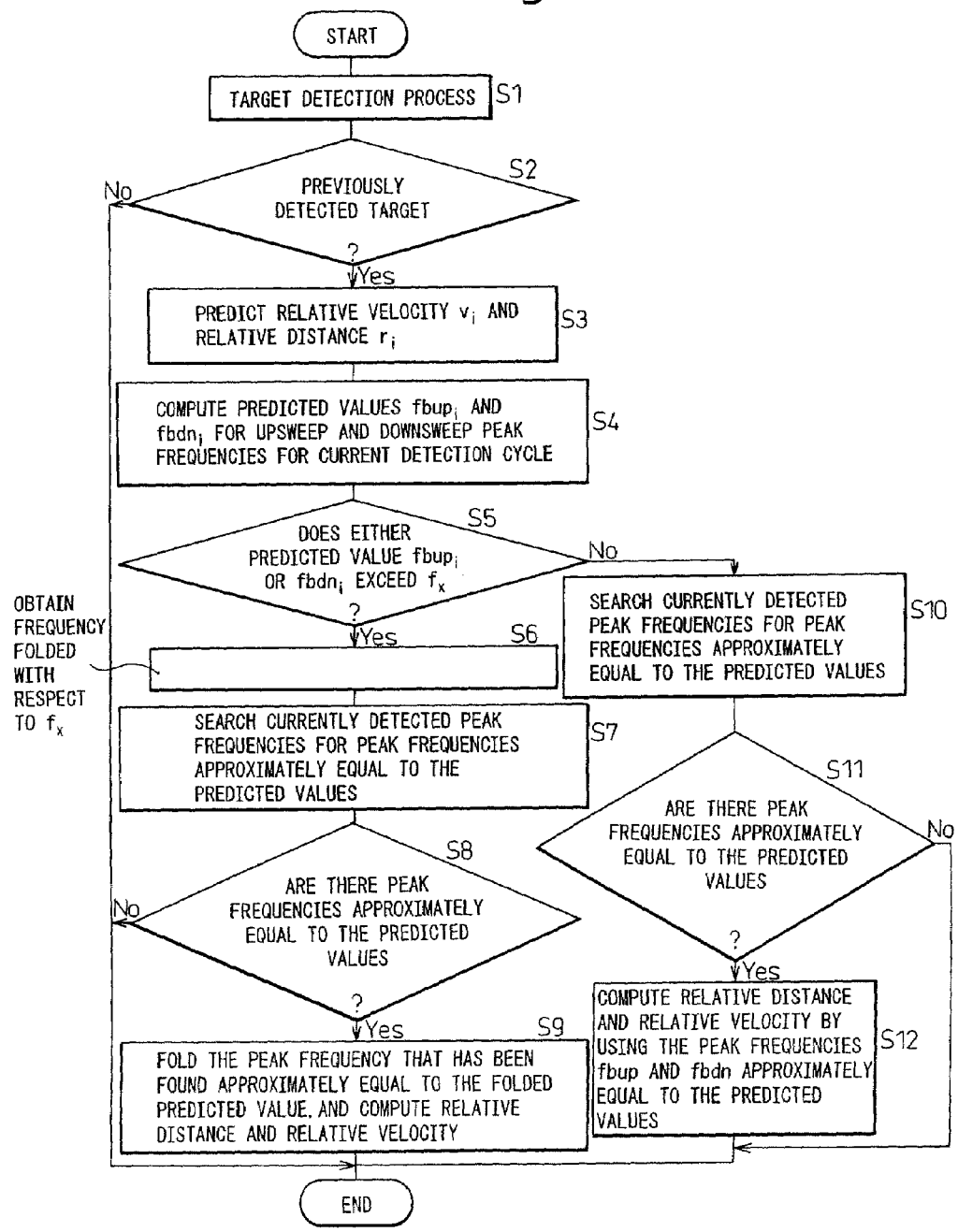

SIGNAL PROCESSING METHOD FOR FM-CW RADAR

CROSS REFERENCE TO RELATED APPLICATION

This application is a continuation of U.S. patent application Ser. No. 10/584,178, filed on Jun. 23, 2006, now U.S. Pat. No. 7,391,361 which is a National Phase Patent Application of International Application Number PCT/JP2004/019698, filed on Dec. 22, 2004, which claims priority of Japanese Patent Application Number 2003-435084, filed on Dec. 26, 2003.

TECHNICAL FIELD

The present invention relates to a signal processing method for an FM-CW radar and, more particularly, to a signal processing method for an FM-CW radar which can accomplish correct pairing even when an upsweep or a downsweep peak frequency has exceeded a detection frequency range and a folded peak frequency has occurred.

BACKGROUND ART

An FM-CW radar measures the distance to a target, such as a vehicle traveling in front, by transmitting a continuous wave frequency-modulated in, for example, a triangular pattern. More specifically, the transmitted wave from the radar is reflected by the vehicle in front, and the reflected signal is received and mixed with a portion of the transmitted signal to produce a beat signal (radar signal). This beat signal is fast Fourier transformed to analyze the frequency. The frequency-analyzed beat signal exhibits a peak, at which the power becomes large, in correspondence with the target. The frequency corresponding to this peak is called the peak frequency. The peak frequency carries information about distance, and the peak frequency differs between the upsweep and downsweep sections of the triangular FM-CW wave because of the Doppler effect associated with the relative velocity with respect to the vehicle traveling in front. The distance and the relative velocity with respect to the vehicle traveling in front can be obtained from the peak frequencies in the upsweep and downsweep sections. If there is more than one vehicle traveling in front, a pair of peak frequencies in the upsweep and downsweep sections is generated for each vehicle. Forming such peak frequency pairs between the upsweep and downsweep sections is called pairing.

FIGS. 1A to 1C are diagrams for explaining the principle of an FM-CW radar when the relative velocity with respect to the target is 0. The transmitted wave is a triangular wave whose frequency changes as shown by a solid line in FIG. 1A. In the figure, $f_0$ is the transmit center frequency of the transmitted wave, $\Delta f$ is the FM modulation amplitude, and Tm is the repetition period. The transmitted wave is reflected from the target and received by an antenna; the received wave is shown by a dashed line in FIG. 1A. The round trip time T to and from the target is given by $T=2r/C$, where r is the distance (range) to the target and C is the velocity of propagation of the radio wave.

Here, the received wave is shifted in frequency from the transmitted signal (i.e., produces a beat) according to the distance between the radar and the target.

The frequency component fb of the beat signal can be expressed by the following equation.

$$fb=fr=(4\cdot\Delta f/C\cdot Tm)r \quad (1)$$

where fr is the frequency due to the range (distance).

FIGS. 2A to 2C, on the other hand, are diagrams for explaining the principle of an FM-CW radar when the relative velocity with respect to the target is v. The frequency of the transmitted wave changes as shown by a solid line in FIG. 2A. The transmitted wave is reflected from the target and received by an antenna; the received wave is shown by a dashed line in FIG. 2A. Here, the received wave is shifted in frequency from the transmitted signal (i.e., produces a beat) according to the distance between the radar and the target. In this case, as the relative velocity with respect to the target is v, a Doppler shift occurs, and the beat frequency component fb can be expressed by the following equation.

$$fb=fr \pm fd=(4\cdot\Delta f/C\cdot Tm)r \pm (2\cdot f_0/C)v \quad (2)$$

where fr is the frequency due to the range, and fd is the frequency due to the velocity.

In the above equation, the peak frequency fbup in the upsweep section and the peak frequency fbdn in the downsweep section are given by $$fbup=fr-fd=(4\cdot\Delta f/C\cdot Tm)r-(2\cdot f_0/C)v \quad (3)$$

$$fbdn=fr+fd=(4\cdot\Delta f/C\cdot Tm)r+(2\cdot f_0/C)v \quad (4)$$

The symbols in the above equations have the following meanings.

fb: Transmit/receive beat frequency
fr: Range (distance) frequency
fd: Velocity frequency
$f_0$: Center frequency of transmitted wave
$\Delta f$: Frequency modulation amplitude
Tm: Period of modulation wave
C: Velocity of light
T: Round trip time of radio wave to and from target object
r: Range (distance) to target object
v: Relative velocity with respect to target object FIG. 3 is a diagram showing one configuration example of an FM-CW radar. As shown, a modulating signal generator 1 applies a modulating signal to a voltage-controlled oscillator 2 for frequency modulation, and the frequency-modulated wave is transmitted out from a transmitting antenna AT, while a portion of the transmitted signal is separated and fed into a frequency converter 3 such as a mixer. The signal reflected from a target, such as a vehicle traveling in front, is received by a receiving antenna AR, and the received signal is mixed with the output signal of the voltage-controlled oscillator 2 to produce a beat signal. The beat signal is passed through a baseband filter 4, and is converted by an A/D converter 5 into a digital signal; the digital signal is then supplied to a CPU 6 where signal processing, such as a fast Fourier transform, is applied to the digital signal to obtain the distance and the relative velocity.

From the above equations (3) and (4)

$$fr=(fbdn+fbup)/2$$

Since $fr=(4\cdot\Delta f/C\cdot Tm)r$, the relative distance r is given by $$r=(C\cdot Tm/8\cdot\Delta f)(fbdn+fbup) \quad (5)$$

Similarly, from the above equations (3) and (4)

$$fd=(fbdn-fbup)/2$$

Since $fd=(2\cdot f_0/C)v$, the relative velocity v is given by $$v=(C/4f_0)(fbdn-fbup) \quad (6)$$

As can be seen from the above equations (5) and (6), the relative velocity v is proportional to the difference between fbdn and fbup, and the relative distance r is proportional to the sum of fbdn and fbup. Therefore, the values of fbdn and fbup decrease as the relative distance r decreases.

FIGS. 4A to 4C are diagrams showing the positional relationship between the upsweep and downsweep peak frequencies when there is a target approaching at a high relative velocity and the relative distance is therefore rapidly decreasing. In the figures, the relative distance is rapidly decreasing as shown in FIGS. 4A, 4B, and 4C in this order. When the target is approaching at a high relative velocity, the difference between the upsweep and downsweep peak frequencies fbup and fbdn increases. On the other hand, when the relative distance decreases, the values of fbup and fbdn decrease; therefore, the values of fbdn and fbup approach zero as shown in FIGS. 4A, 4B, and 4C in this order, and eventually, the upsweep peak frequency fbup enters the negative frequency range as shown in FIG. 4C. If this happens, the upsweep peak frequency fbup can no longer be detected, resulting in an inability to detect the target. Furthermore, when the upsweep peak frequency fbup enters the negative frequency range, a peak due to a folded frequency f'bup occurs as shown by a dashed line and, as a result, erroneous pairing is done, thus resulting in erroneous measurements of the relative distance and the relative velocity.

FIGS. 5A to 5C are diagrams showing the positional relationship between the upsweep and downsweep peak frequencies when there is a target receding at a high relative velocity and the relative distance is therefore rapidly increasing. In the figures, the relative distance is rapidly increasing as shown in FIGS. 5A, 5B, and 5C in this order. When the target is receding at a high relative velocity, the difference between the upsweep and downsweep peak frequencies fbup and fbdn increases. On the other hand, when the relative distance increases, the values of fbup and fbdn increase; therefore, the values of fbdn and fbup increase as shown in FIGS. 5A, 5B, and 5C in this order, and eventually, the upsweep peak frequency fbup exceeds the detection frequency range fx as shown in FIG. 5C. If this happens, the upsweep peak frequency fbup can no longer be detected, resulting in an inability to detect the target. Furthermore, when the upsweep peak frequency fbup exceeds the detection frequency range, a peak due to a folded frequency f'bup occurs as shown by a dashed line, and as a result, erroneous pairing is done, thus resulting in erroneous measurements of the relative distance and the relative velocity.

In a prior art signal processing apparatus for an FM-CW radar, the folded peak frequency is detected by analyzing the frequency obtained when the sampling frequency is set to one half of the normal sampling frequency, and pairing is done between the upsweep and downsweep peak frequencies after converting the folded peak frequency into a peak frequency that would be obtained if there were no frequency folding (for example, refer to Japanese Unexamined Patent Publication No. H11-271426).

Further, a pulse-repetition frequency-pulse Doppler radar is disclosed that measures a correct distance by avoiding the influence of the frequency folding (for example, refer to Japanese Examined Patent Publication No. H06-70673).

DISCLOSURE OF THE INVENTION

It is an object of the present invention to provide a signal processing method for an FM-CW radar that can accurately detect the relative distance, relative velocity, etc. with respect to a target approaching or receding at a high relative velocity.

According to the signal processing method for an FM-CW radar of the present invention, predicted values for peak frequencies currently detected in upsweep and downsweep sections are computed from the previously detected relative distance and relative velocity, and it is determined whether any of the predicted values exceeds a detection frequency range and, if there is a peak frequency that exceeds the detection frequency range, the frequency is folded and the folded frequency is taken as a predicted value, the method then proceeds to search the currently detected peak frequencies to determine whether there are upsweep and downsweep peak frequencies approximately equal to the predicted values and, if such upsweep and downsweep peak frequency are found, the peak frequency approximately equal to the folded predicted value is folded and the folded peak frequency is used.

Further, according to the signal processing method for FM-CW radar of the present invention, relative distance $(r_a)$ and relative velocity $(v_a)$ are obtained based on the peak frequencies occurring in the upsweep and downsweep sections, relative distance $(r_b)$ and relative velocity $(v_b)$ are computed by folding one or the other of the peak frequencies occurring in the upsweep and downsweep sections, when the values of the relative distance $(r_b)$ and the relative velocity $(v_b)$ are outside a prescribed range, instantaneous errors $(\Delta r_a$ and $\Delta r_b)$ for the relative distances $(r_a$ and $r_b)$ are obtained, integrated values $(\Sigma \Delta r_a$ and $\Sigma \Delta r_b)$ are obtained for the respective instantaneous errors, and when neither $\Delta r_b \geq \Delta r_a$ nor $\Sigma \Delta r_b \geq \Sigma \Delta r_a$ holds, the relative distance $(r_b)$ and the relative velocity $(v_b)$ computed by folding the peak frequency are employed.

On the other hand, when both $\Delta r_b \geq \Delta r_a$ and $\Sigma \Delta r_b \geq \Sigma \Delta r_a$ hold, the relative distance $(r_a)$ and the relative velocity $(v_a)$ obtained without folding any peak frequency are employed.

When one or the other of $\Delta r_b \geq \Delta r_a$ and $\Sigma \Delta r_b \geq \Sigma \Delta r_a$ does not hold, a determination as to which data is to be employed is not made until the next cycle.

Further, according to the signal processing method for an FM-CW radar of the present invention, relative distance $(r_a)$ and relative velocity $(v_a)$ are obtained based on the peak frequencies occurring in the upsweep and downsweep sections, relative distance $(r_b)$ and relative velocity $(v_b)$ are computed by folding one or the other of the peak frequencies occurring in the upsweep and downsweep sections and, when the value of the relative distance $(r_b)$ is within a prescribed range, the relative distance $(r_a)$ and the relative velocity $(v_a)$ obtained without folding any peak frequency are employed.

According to the present invention, even when the peak frequency in the upsweep or downsweep section has exceeded the detection frequency range and a folded peak frequency has occurred, correct pairing can be done, so that the relative distance and relative velocity with respect to the target can be accurately detected.

BRIEF DESCRIPTION OF THE DRAWINGS

FIG. 6 is a flowchart showing an embodiment according to the present invention.

FIG. 7 is a flowchart showing an embodiment according to the present invention.

Figure 1A:
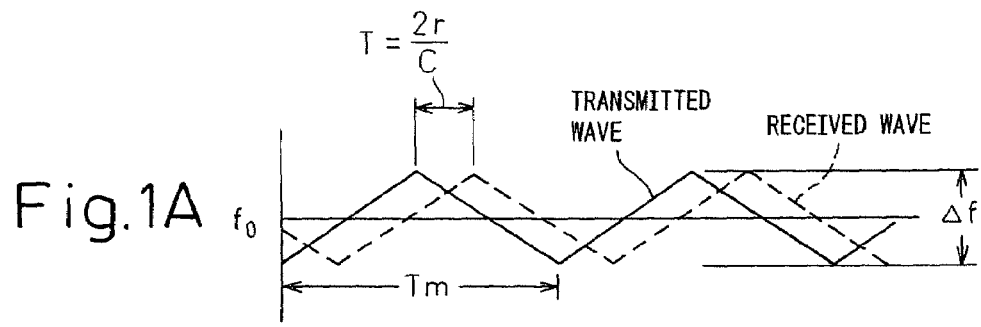
FIGS. 1A to 1C are diagrams for explaining the principle of an FM-CW radar when the relative velocity with respect to a target is 0.
Figure 1B:
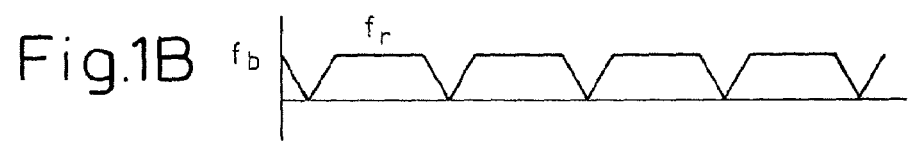
Figure 1C:
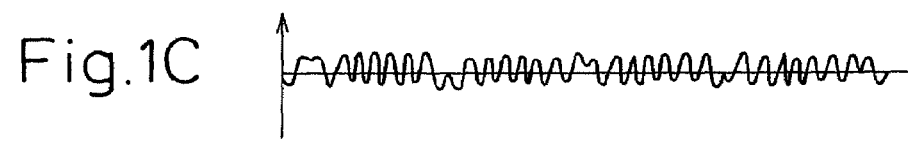
Figure 2A:
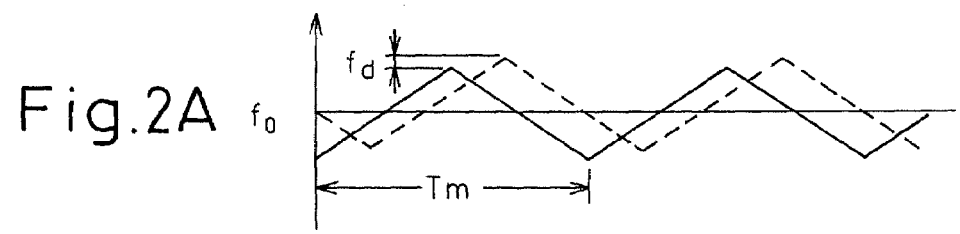
FIGS. 2A to 2C are diagrams for explaining the principle of FM-CW radar when the relative velocity with respect to a target is v.
Figure 2B:
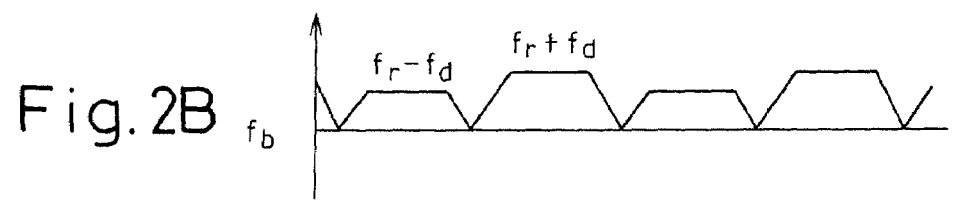
Figure 2C:
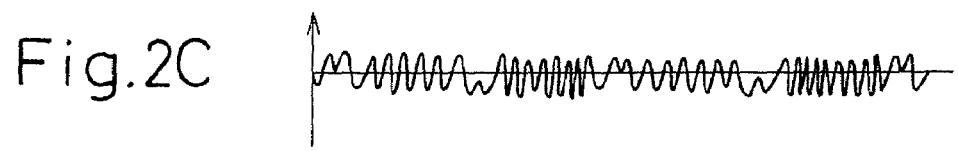

BEST MODE FOR CARRYING OUT THE INVENTION (1) In the case of a previously detected target, the relative velocity v and the relative distance r are predicted in the following manner. The relative velocity v is predicted by assuming that the current detection value $v_i$ is approximately the same as the previous detection value $v_{i-1}$, that is $$v_i \approx v_{i-1} \quad (7)$$

On the other hand, the relative distance r is predicted by assuming that the current detection value $r_i$ is related to the previous detection value $r_{i-1}$ by $$r_i \approx r_{i-1} + v_{i-1} \cdot t \quad (8)$$

where t is the elapsed time between the previous detection and the current detection.

(2) Next, the predicted value $fbup_i$ of the peak frequency in the upsweep section and the predicted value $fbdn_i$ of the peak frequency in the downsweep section are obtained by using the earlier given equations (5) and (6).

That is $$r_i = (C \cdot Tm/8 \cdot \Delta f)(fbdn_i + fbup_i) \quad (9)$$

and $$v_i = (C/4f_0)(fbdn_i - fbup_i) \quad (10)$$

Hence $$fbup_1 = (4 \cdot \Delta f/C \cdot Tm)r_i - (2f_0/C)v_i \quad (11)$$

$$fbdn_1 = (4 \cdot \Delta f/C \cdot Tm)r_i + (2f_0/C)v_i \quad (12)$$

The predicted values $fbup_i$ and $fbdn_i$ of the upsweep and downsweep peak frequencies in the current detection cycle can thus be computed.

Figure 4A:
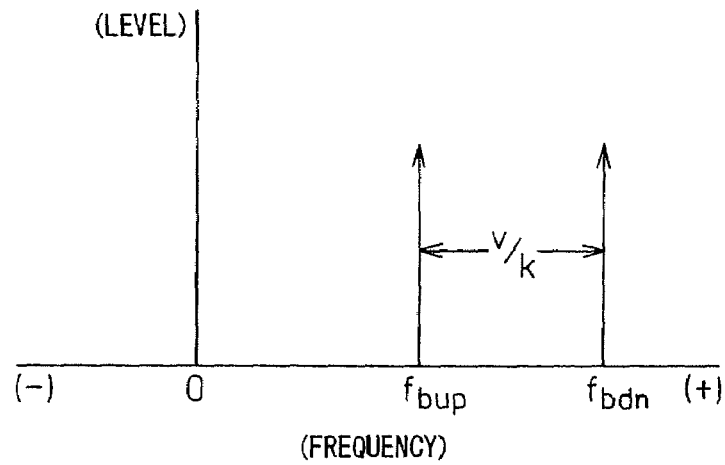
FIGS. 4A to 4C are diagrams showing the positional relationship between upsweep and downsweep peak frequencies when there is a target approaching at a high relative velocity and the relative distance is therefore rapidly decreasing.
Figure 4B:
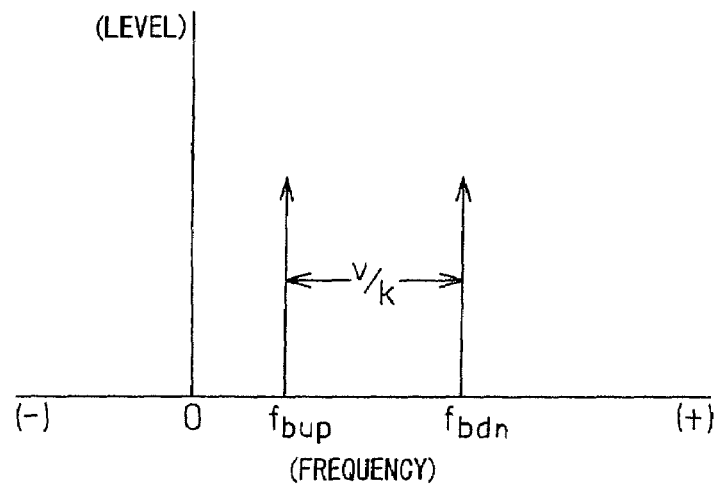
Figure 4C:
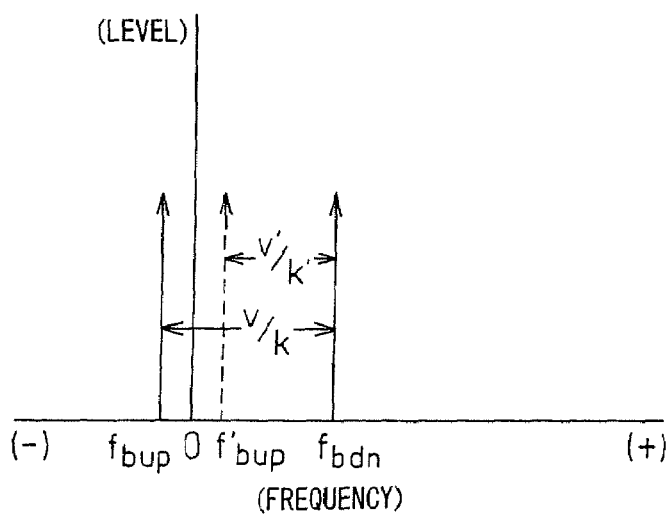

(3) As shown in FIGS. 4A to 4C, when there is a target approaching at a high relative velocity, and the relative distance is therefore rapidly decreasing, the values of fbdn and fbup approach zero, and eventually, the upsweep peak frequency fbup enters the negative frequency range as shown in FIG. 4C. In this case, a peak due to a folded frequency f'bup occurs; as a result, this frequency is detected, and erroneous pairing is done based on this frequency.

In such cases, in the present invention, $fbup_i$ is obtained from the above equation (11) and, if the resulting value is negative, it is determined that the detected f'bup is the folded frequency. Then, -f'bup obtained by inverting the sign is taken as the actual upsweep peak frequency fbup, and the relative distance r and the relative velocity v are computed from the equations (5) and (6) by substituting -f'bup for fbup and the currently detected value for fbdn.

FIGS. 4A to 4C have been shown above by taking as an example the case where the upsweep peak frequency fbup enters the negative frequency range but, in the case of a target receding at a high relative velocity, the downsweep peak frequency fbdn may enter the negative frequency range. In either case, only one or the other of the peak frequencies can enter the negative frequency range.

Figure 5A:
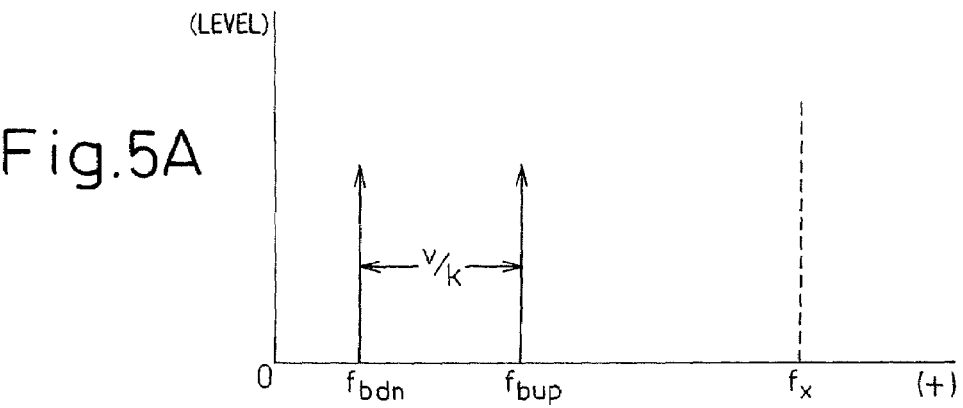
FIGS. 5A to 5C are diagrams showing the positional relationship between upsweep and downsweep peak frequencies when there is a target receding at a high relative velocity and the relative distance is therefore rapidly increasing.
Figure 5B:
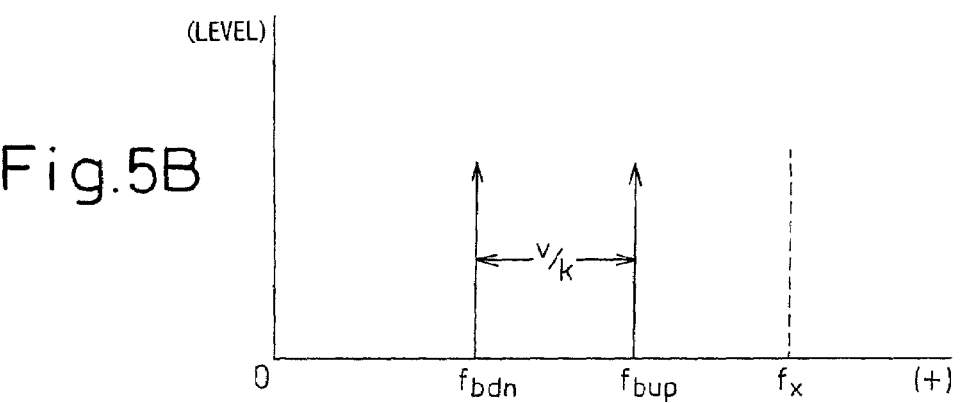
Figure 5C:
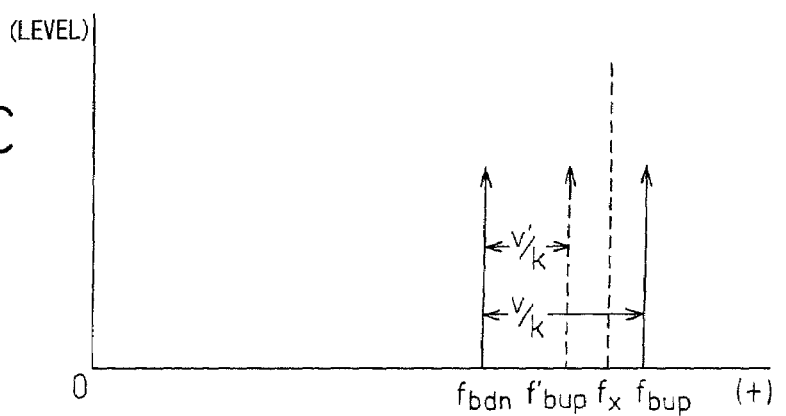

(4) As shown in FIGS. 5A to 5C, when there is a target receding at a high relative velocity, and the relative distance is therefore rapidly increasing, the upsweep peak frequency fbup can exceed the detection frequency range fx as shown in FIG. 5C. If this happens, a peak due to a folded frequency f'bup occurs as shown by a dashed line; as a result, this frequency is detected, and erroneous pairing is done based on this frequency.

In such cases, in the present invention, $fbup_i$ is obtained from the above equation (11) and, if the resulting value exceeds the detection frequency range fx, it is determined that the detected f'bup is the folded frequency. Then, the actual upsweep peak frequency fbup is obtained, and the relative distance r and the relative velocity v are computed by using the thus obtained actual upsweep peak frequency fbup and the currently detected downsweep peak frequency fbdn.

The actual upsweep peak frequency fbup is obtained in the following manner. In FIG. 5C, when the upper limit frequency of the detection frequency range is denoted by fx, the actual upsweep peak frequency fbup is given by $$fbup = fx + (fx - f'bup)$$

Therefore, the relative distance r and the relative velocity v are computed from the equations (5) and (6) by substituting fx+(fx-f'bup) for fbup and the currently detected value for fbdn.

EMBODIMENT 1

[The Case of a Previously Detected Target]

Figure 3:
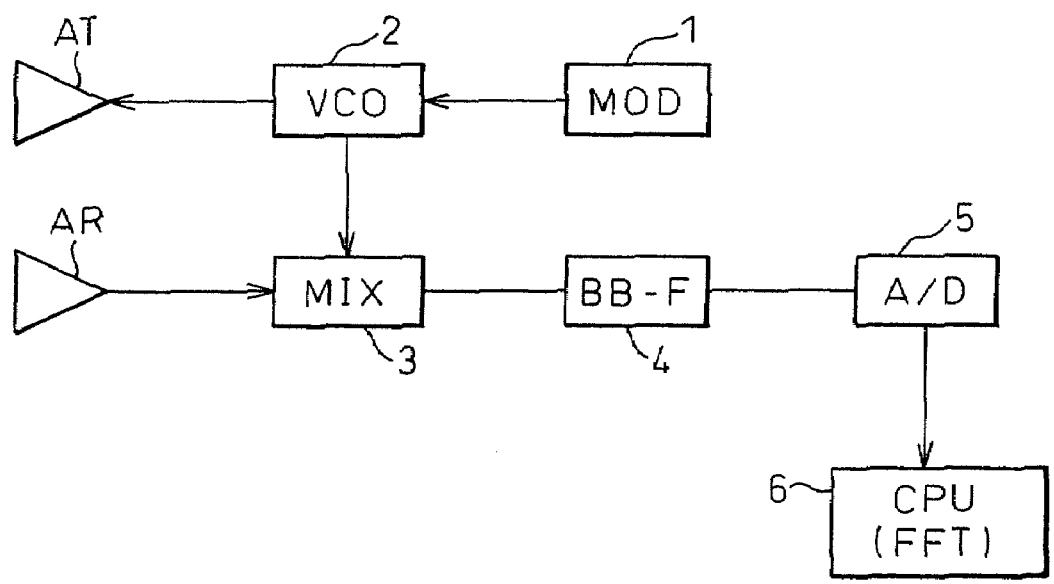
FIG. 3 is a diagram showing one configuration example of an FM-CW radar.

FIG. 6 is a flowchart showing an embodiment according to the present invention for the case of a previously detected target. The sequence of operations shown in the flowchart is controlled by a CPU contained in the radar apparatus, for example, the CPU 5 shown in FIG. 3.

In FIG. 6, when the target detection process is started (S1), it is determined whether there is any previously detected target (S2). If there is such a target (Yes), the relative velocity $v_i$ and the relative distance $r_i$ in the current cycle of the routine are predicted (S3). The predictions are done using the earlier given equations (7) and (8).

Next, predicted values $fbup_i$ and $fbdn_i$ for the upsweep and downsweep peak frequencies detected in the current cycle of the routine are computed from the equations (11) and (12), respectively (S4). Then, it is determined whether one or the other of the thus computed predicted values $fbup_i$ and $fbdn_i$ is negative or not (S5). If, for example, the predicted value $fbup_i$ is negative (Yes), it can be suspected that the upsweep peak frequency fbup lies in the negative range as shown in FIG. 4C; therefore, the sign of the negative frequency data $fbup_i$ computed as the predicted value is inverted (S6).

Next, the currently detected peak frequencies are searched to see if there are peak frequencies approximately equal to the peak frequencies computed as the predicted values (S7). Here, the above frequency data ($-fbup_i$) obtained by inverting the sign is used as one of the predicted values. Then, it is determined whether there are upsweep and downsweep peak frequencies approximately equal to the predicted values −fbup$_i$ and fbdn$_i$ (S8). If there are such frequencies (Yes), the relative distance and relative velocity with respect to the target are computed by using, out of the currently detected peak frequencies, the upsweep peak frequency f'bup approximately equal to the predicted value −fbup$_i$ and the downsweep peak frequency fbdn approximately equal to the predicted value fbdn$_i$ (S9). Here, for the peak frequency f'bup for which the predicted value is determined to be negative, the detected peak frequency is used by inverting the sign of the frequency data.

In the above flowchart, if the answer in S2 or S8 is No, the routine is immediately terminated.

On the other hand, if the answer in S5 in FIG. 6 is No, that is, if neither the computed predicted value fbup$_i$ nor fbdn$_i$ is negative, the currently detected peak frequencies are searched to see if there are peak frequencies equal to the peak frequencies computed as the predicted values (S11). Then, it is determined whether there are upsweep and downsweep peak frequencies fbup and fbdn approximately equal to the predicted values (S11). If there are such frequencies (Yes), the relative distance and relative velocity with respect to the target are computed by using, out of the currently detected peak frequencies, the upsweep peak frequency fbup approximately equal to its predicted value and the downsweep peak frequency fbdn approximately equal to its predicted value (S12). If the answer in S11 is No, the routine is terminated without computing the relative distance or the relative velocity.

EMBODIMENT 2

[The Case of Previously Detected Target]

FIG. 7 is a flowchart showing another embodiment according to the present invention for the case of a previously detected target. The sequence of operations shown in the flowchart is controlled by a CPU contained in the radar apparatus, for example, the CPU 5 shown in FIG. 3.

In FIG. 7, the operations from S1 to S4 are the same as those shown in FIG. 6. In this flowchart, it is determined whether one or the other of the computed predicted values fbup$_i$ and fbdn$_i$ exceeds the detection frequency range fx or not (S5). If it does (Yes), that is, when a situation such as that shown in FIG. 5C is suspected, a frequency f'bup$_i$ that occurs when the frequency fbup$_i$ as the predicted value is folded with respect to the frequency fx is obtained from the following equation (S6).

$$fbup_i = fx + (fx - f'bup_i)$$

$$f'bup_i = 2fx - fbup_i$$

Next, the currently detected peak frequencies are searched to see if there are peak frequencies approximately equal to the peak frequencies computed as the predicted values (S7). Here, the folded frequency data (f'bup$_i$) is used as one of the predicted values. Then, it is determined whether there are upsweep and downsweep peak frequencies approximately equal to the predicted values f'bup$_i$ and fbdn$_i$ (S8). If there are such frequencies (Yes), the relative distance and relative velocity with respect to the target are computed by using, out of the currently detected peak frequencies, the upsweep peak frequency f'bup approximately equal to its predicted value and the downsweep peak frequency fbdn approximately equal to its predicted value (S9). Here, for the upsweep peak frequency for which the predicted value is determined to have exceeded the detection frequency range fx, the frequency fbup that occurs when the detected peak frequency f'bup is folded with respect to the frequency fx is obtained from the following equation.

$$fbup = fx + (fx - f'bup)$$

In the above flowchart, if the answer in S2 or S8 is No, the routine is immediately terminated.

On the other hand, if the answer in S5 in FIG. 6 is No, that is, if neither the computed predicted value fbup$_i$ nor fbdn$_i$ exceeds the upper limit frequency fx, the currently detected peak frequencies are searched to see if there are peak frequencies approximately equal to the peak frequencies computed as the predicted values (S10). Then, it is determined whether there are upsweep and downsweep peak frequencies approximately equal to the predicted values fbup$_i$ and fbdn$_i$ (S11). If there are such frequencies (Yes), the relative distance and relative velocity with respect to the target are computed by using, out of the currently detected peak frequencies, the upsweep peak frequency fbup approximately equal to its predicted value and the downsweep peak frequency fbdn approximately equal to its predicted value (S12). If the answer in S11 is No, the routine is terminated without computing the relative distance or the relative velocity.

EMBODIMENT 3

[The Case of New Target]

Figure 8:
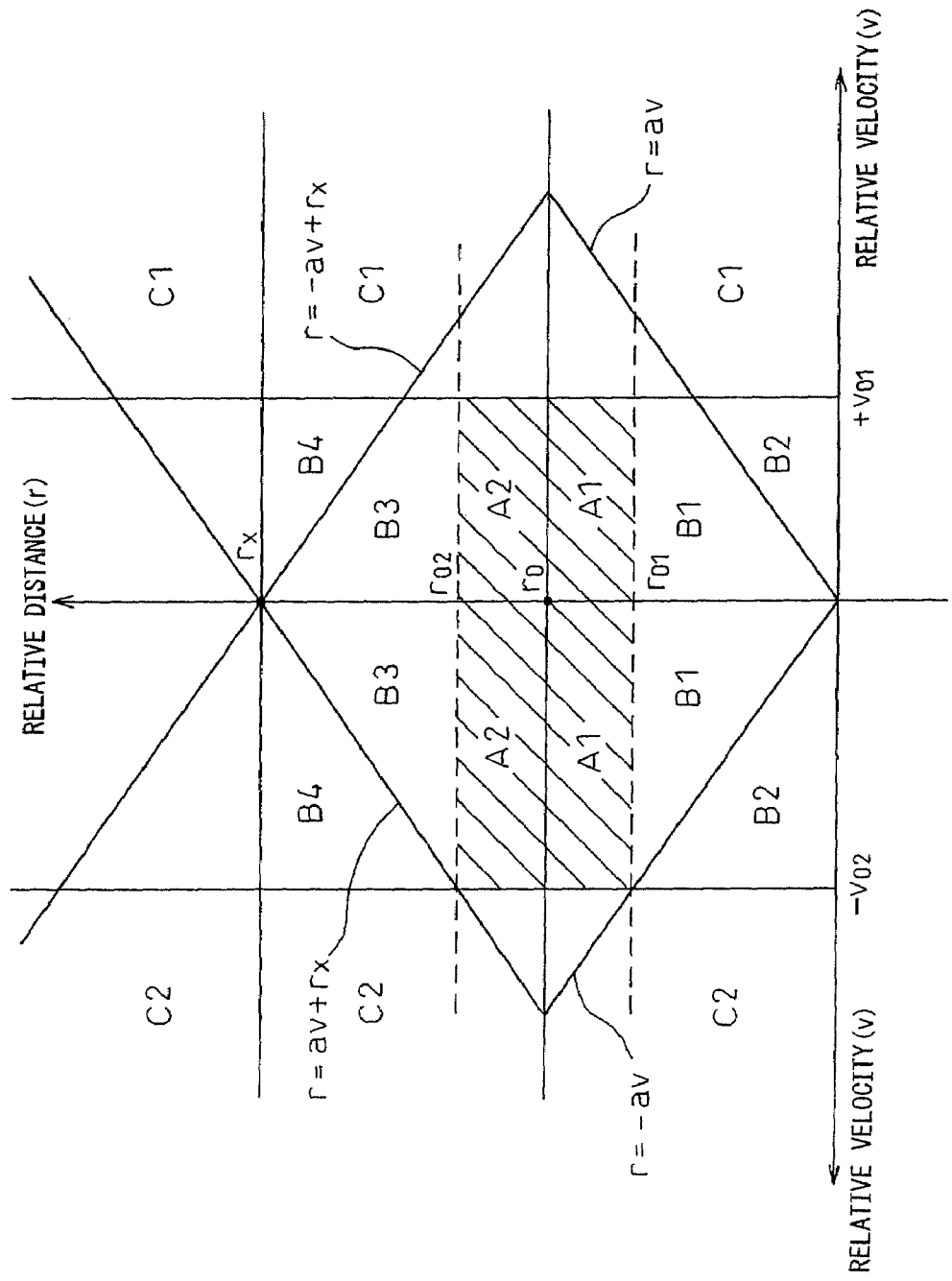
FIG. 8 is a diagram for explaining an embodiment of the present invention.

Before describing an embodiment of the present invention for the case of a new target, the range within which the distance and the relative velocity can be accurately detected by a radar will be described below with reference to the graph of FIG. 8. In FIG. 8, the horizontal axis represents the relative velocity (v), and the vertical axis the relative distance (r) to the target. The right-hand side of the horizontal axis indicates the positive relative velocity (+v), i.e., the target is receding. The left-hand side of the horizontal axis indicates the negative relative velocity (−v), i.e., the target is approaching.

In the graph of FIG. 8, +v$_{01}$ is the relative velocity of a receding target beyond which the relative velocity need not be detected by the radar (region C1); this relative velocity can be set, for example, to 150 km/h. This represents a situation where, for example, when the radar-equipped vehicle is stationary, the target is moving away at 150 km/h; usually, a target receding faster than this relative velocity need not be detected by the radar. Moreover, if the target is detected in this region, the detected data is highly likely to be in error.

On the other hand, −v$_{02}$ is the relative velocity of an approaching target beyond which the relative velocity need not be detected by the radar (region C2); this relative velocity can be set, for example, to 300 km/h. This represents a situation where, for example, when the radar-equipped vehicle is traveling at 150 km/h, an oncoming vehicle traveling at 150 km/h is detected; usually, a target approaching faster than this relative velocity need not be detected by the radar. Moreover, if the target is detected in this region, the detected data is highly likely to be in error.

In the graph of FIG. 8, a diamond-shaped region is the region where no folding occurs, and this region is bounded by the following straight lines, as shown in the figure. This diamond-shaped region is also the region into which data may be folded.

(1) r=av (2) r=−av+r$_x$ (3) r=−av (4) r=av+r$_x$

Here, the straight lines forming the diamond-shaped region show the relationship between the relative distance (r) and the relative velocity (v) obtained when the frequency in either the upsweep or the downsweep section changes while holding the frequency in the other section at zero, and can vary according to each individual radar.

The value $r_x$ of an upper vertex of the diamond on the vertical axis indicates the distance limit within which no folding occurs when the relative velocity is zero. Accordingly, the third embodiment deals with the case where the relative distance is within the distance limit $r_x$.

The point at which the diagonal extending in the horizontal direction of the diamond intersects the vertical axis is denoted by $r_0$. Further, between the point at which the straight lines $v=v_{01}$ and r=av intersect and the point at which the straight lines $v=-v_{02}$ and r=−av intersect, the point that yields the greater relative distance value r is found, and the relative distance value at this point is denoted by $r=r_{01}$. On the other hand, between the point at which the straight lines $v=v_{01}$ and $r=-av+r_x$ intersect and the point at which the straight lines $v=-v_{02}$ and $r=av+r_x$ intersect, the point that yields the smaller relative distance value r is found, and the relative distance value at this point is denoted by $r=r_{02}$.

Then, the region defined by the relations $-v_{02} \leq v \leq v_{01}$ and $r_{02} > r > r_{01}$ is denoted by A (A1, A2). The region A is the region where no folding occurs and where there is no possibility of folded data entering it.

On the other hand, in the region B defined by the relations $-v_{02} \leq v \leq v_{01}$ and $r_{01} \geq r \geq 0$, the sub-region B2 outside the diamond is the region into which the lower frequency is folded, and the sub-region B1 inside the diamond is the region that may contain folded data.

Further, in the region defined by the relations $-v_{02} \leq v \leq v_{01}$ and $r_x \geq r \geq r_{02}$, the sub-region B4 outside the diamond is the region into which the higher frequency is folded, and the sub-region B3 inside the diamond is the region that may contain folded data.

Figure 9:
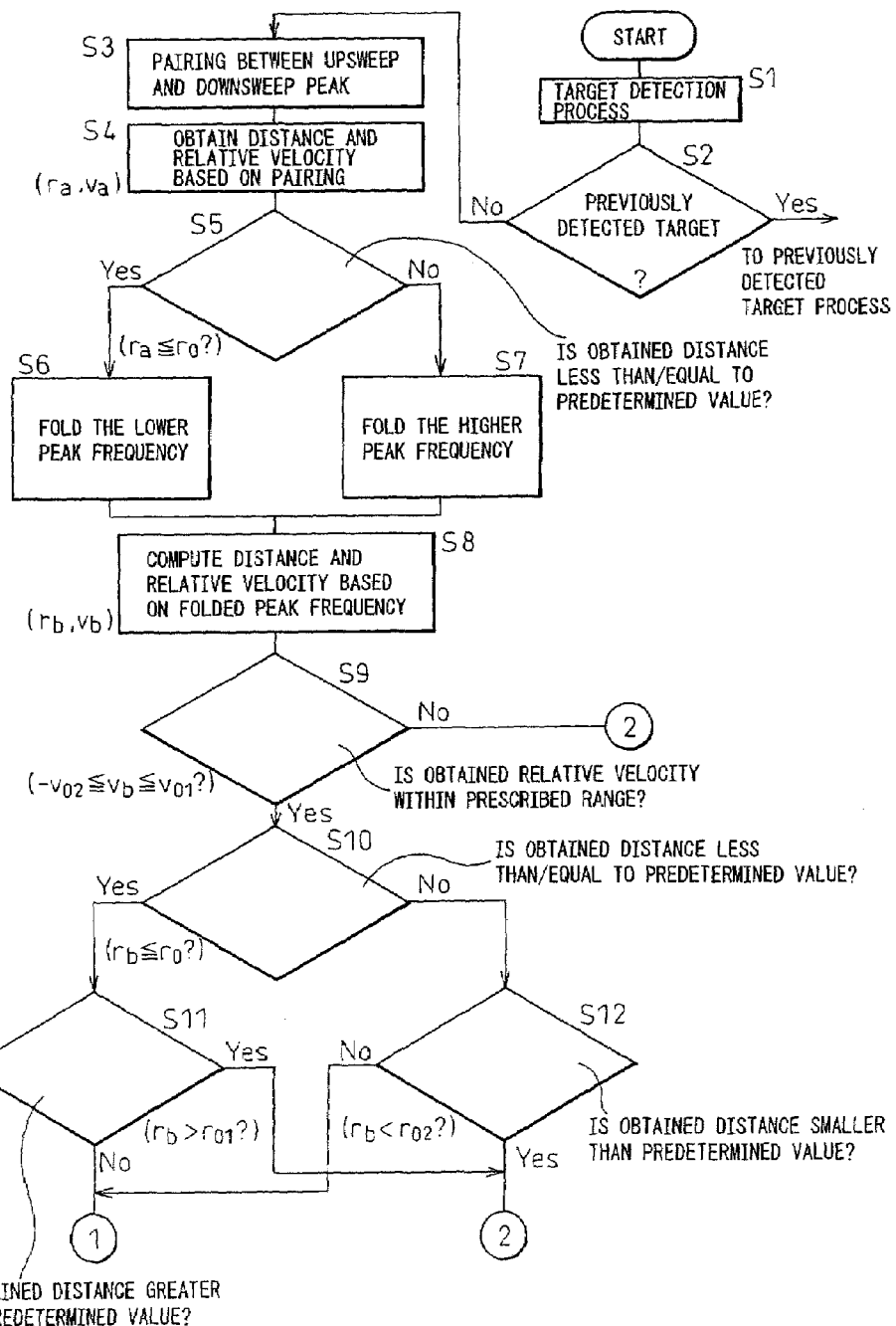
FIG. 9 is a flowchart showing an embodiment according to the present invention.
Figure 10:
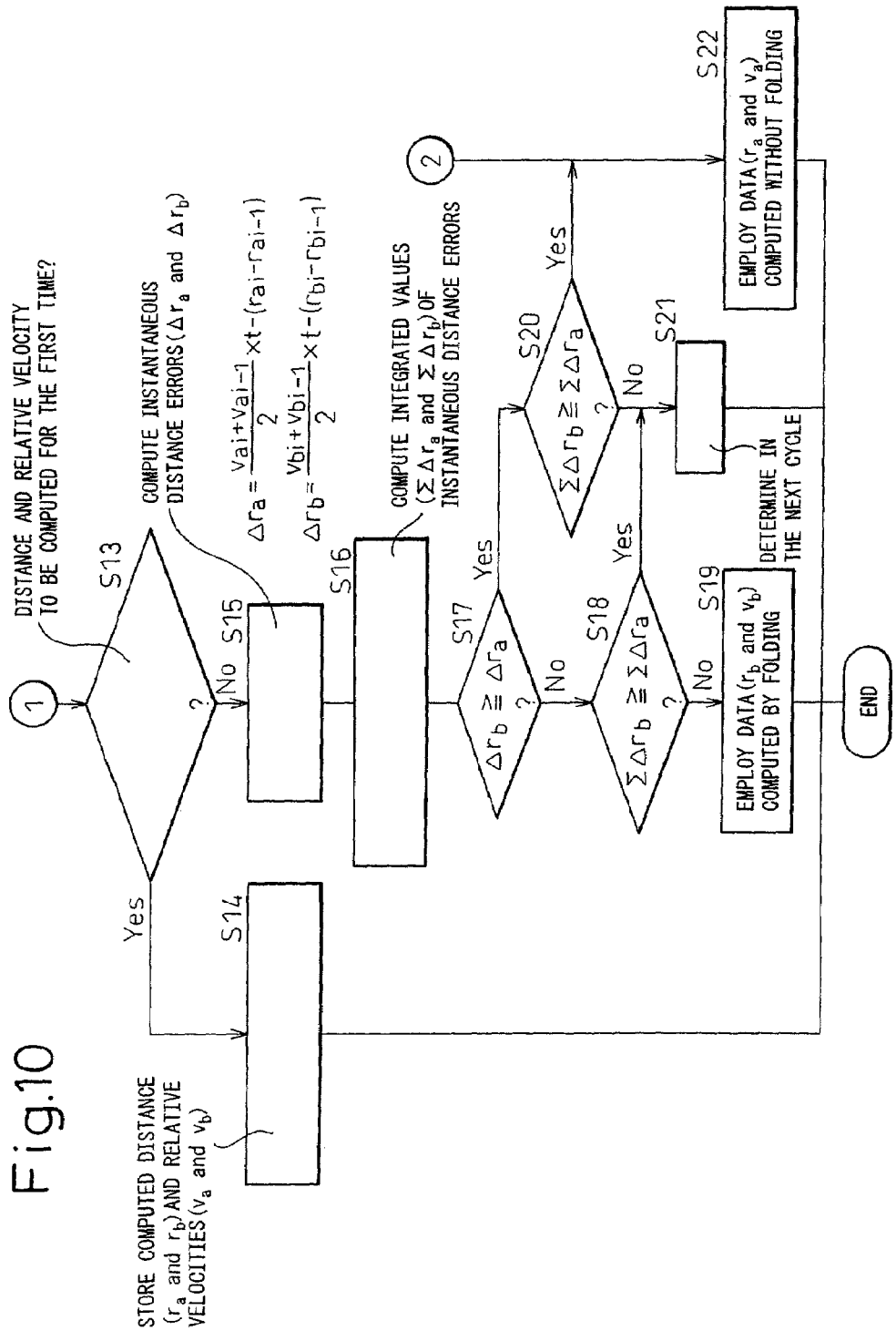
FIG. 10 is a flowchart showing the embodiment according to the present invention.

FIGS. 9 and 10 are flowcharts showing the embodiment according to the present invention for the case of a new target. The sequence of operations shown in the flowcharts is controlled by a CPU contained in the radar apparatus, for example, the CPU 3 shown in FIG. 3.

In the flowchart of FIG. 9, when the target detection process is started (S1), it is determined whether there is any previously detected target (S2). If there is such a target (Yes), the sequence of operations shown in FIG. 6 or 7 is performed.

If it is determined that there is no previously detected target (No in S2), pairing is done between the peak frequencies detected in the upsweep and downsweep sections (S3). Then, the distance ($r_a$) and relative velocity ($v_a$) with respect to the target are obtained based on the pairing (S4).

Next, it is determined whether or not the thus obtained distance $r_a$ is less than or equal to the predetermined value $r_0$ (see FIG. 8) (S5). If $r_a \leq r_0$ (Yes), the lower of the peak frequencies is folded (S6). On the other hand, if the relation $r_a \leq r_0$ does not hold (No), the higher of the peak frequencies is folded (S7). Then, distance ($r_b$) and relative velocity ($v_b$) are obtained based on the folded peak frequency (S8).

Next, it is determined whether the thus obtained relative velocity ($v_b$) is within a prescribed range (S9). The prescribed range in this case is the range where the relative velocity ($v_b$) is neither in the region C1 nor in the region C2 in FIG. 8, that is, the range defined by the relation $-v_{02} \leq v_b \leq v_{01}$.

If the obtained relative velocity ($v_b$) is not within the prescribed range (No), the distance ($r_a$) and relative velocity ($v_a$) obtained without folding are employed (S22 in FIG. 10). On the other hand, if the relative velocity ($v_b$) is within the prescribed range (Yes), then it is determined whether or not the obtained distance ($r_b$) is less than or equal to the predetermined value $r_0$ (S10).

If the obtained distance ($r_b$) is less than or equal to the predetermined value $r_0$, that is, $r_b \leq r_0$ (Yes), it is determined whether the obtained distance is greater than the predetermined value $r_{01}$, that is, $r_b > r_{01}$ or not (S11). If $r_b > r_{01}$ (Yes), the obtained distance is contained in the region A1 indicated by oblique hatching in FIG. 8; therefore, the distance ($r_a$) and relative velocity ($v_a$) obtained without folding are employed (S22 in FIG. 10).

On the other hand, if the answer in S11 is No, the obtained distance is contained in the region B1 or B2 shown in FIG. 8; therefore, the process proceeds to S13 in the flowchart of FIG. 10.

If, in S10, the obtained distance ($r_b$) is greater than the predetermined value $r_0$, that is, if the relation $r_b \leq r_0$ does not hold (No), then it is determined whether the obtained distance is smaller than the predetermined value $r_{02}$, that is, $r_b < r_{02}$ or not (S12). If $r_b < r_{02}$ (Yes), the obtained distance is contained in the region A2 indicated by oblique hatching in FIG. 8; therefore, the distance ($r_a$) and relative velocity ($v_a$) obtained without folding are employed (S22 in FIG. 10).

On the other hand, if the answer in S12 is No, the obtained distance is contained in the region B3 or B4 shown in FIG. 8; therefore, the process proceeds to S13 in the flowchart of FIG. 10.

If the answer in S11 or S12 is No, the relative distance $r_b$ is contained in the region B (B1, B2, B3, B4) shown in FIG. 8. In this case, it is determined whether the distance ($r_a$, $r_b$) and the relative velocity ($v_a$, $v_b$) are calculated for the first time (S13).

If the distance and the relative velocity are calculated for the first time (Yes in S13), the distance ($r_a$) and relative velocity ($v_a$) obtained based on the pairing and the distance ($r_b$) and relative velocity ($v_b$) obtained by folding the peak frequency are stored (S14).

If the distance and the relative velocity are not ones calculated for the first time (No in S13), an instantaneous error $\Delta r_a$ between the previously obtained distance ($r_{ai-1}$) and the currently obtained distance ($r_{ai}$) is computed from the following equation (S15).

$$\Delta r_a = \{(v_{ai}+v_{ai-1})/2)\}t - (r_{ai}-r_{ai-1})$$

In the above equation, $v_{ai}$ is the currently obtained relative velocity, and $v_{ai-1}$ is the previously obtained relative velocity.

Similarly, an instantaneous error $\Delta r_b$ between the distance ($r_{bi-1}$) previously obtained by folding the peak frequency and the distance ($r_{bi}$) currently obtained by folding the peak frequency is computed from the following equation (S10).

$$\Delta r_b = \{(v_{bi}+v_{bi-1})/2)\}t - (r_{bi}-r_{bi-1})$$

In the above equation, $v_{bi}$ is the relative velocity currently obtained by folding the peak frequency, and $v_{bi-1}$ is the relative velocity previously obtained by folding the peak frequency.

Next, integrated values $\Sigma\Delta r_a$ and $\Sigma\Delta r_b$ of the respective instantaneous distance errors ($\Delta r_a$) and ($\Delta r_b$) are computed (S16).

Then, it is determined whether the relation $\Delta r_b \geq \Delta r_a$ holds or not (S17); if the relation $\Delta r_b \geq \Delta r_a$ does not hold (No), then it is determined whether the relation $\Sigma\Delta r_b \geq \Sigma\Delta r_a$ holds or not (S18). If the relation $\Sigma\Delta r_b \geq \Sigma\Delta r_a$ does not hold (No), the distance ($r_b$) and relative velocity ($v_b$) obtained by folding the peak frequency are employed (S19), because the instantaneous distance errors ($\Delta r_b$) obtained by folding the peak frequency and its integrated value ($\Sigma\Delta r_b$) are both smaller than the instantaneous distance error ($\Delta r_a$) obtained without folding and its integrated value ($\Sigma \Delta r_a$).

On the other hand, if the answer in S17 is Yes, that is, if $\Delta r_b \geq \Delta r_a$, then it is determined whether the relation $\Sigma \Delta r_b \geq \Sigma \Delta r_a$ holds or not (S20) and, if the answer is No, which data is to be employed is determined in the next cycle (S21). Likewise, if $\Sigma \Delta r_b \geq \Sigma \Delta r_a$ holds in S18 (Yes), which data is to be employed is also determined in the next cycle (S21).

If $\Sigma \Delta r_b \geq \Sigma \Delta r_a$ holds in S20 (Yes), the distance ($r_a$) and relative velocity ($v_a$) obtained without folding are employed as the data (S22), because the instantaneous distance errors ($\Delta r_a$) obtained without folding and its integrated value ($\Sigma \Delta r_a$) are both smaller than the instantaneous distance error ($\Delta r_b$) obtained by folding the peak frequency and its integrated value ($\Sigma \Delta r_b$).

Here, as indicated in S21, if one or the other of the relations $\Delta r_b \geq \Delta r_a$ and $\Sigma \Delta r_b \geq \Sigma \Delta r_a$ does not hold, the determination as to which data is to be employed is not made here, but is made in the next cycle.

In the third embodiment, the regions C1 and C2 have been defined as regions outside the thresholds of +150 km/h and −300 km/h, respectively, irrespective of the relative distance, but these threshold values may be varied according to the relative distance. For example, the lower limit of region C1 may be set to +150 km/h when the relative distance is 0, but reduced to +100 km/h when the relative distance is $r_x$. In this case, the amount of processing can be reduced by not detecting a high-speed receding target at long range. Further, C1 and C2 may each be defined by a boundary line or a curve or the like whose value varies stepwise according to the relative distance.

Figure 11:
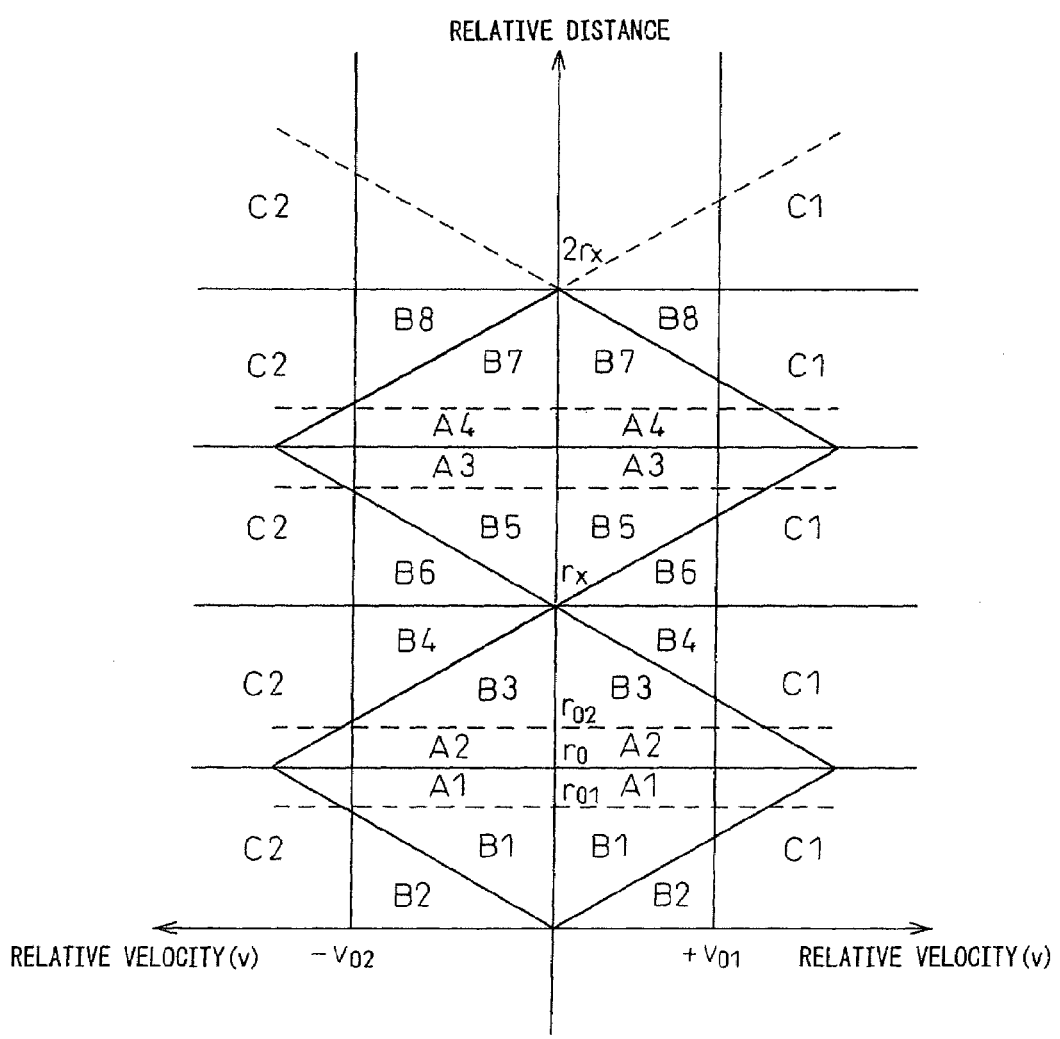
FIG. 11 is a diagram for explaining an embodiment of the present invention.

Further, the third embodiment has been described by dealing with the range where the relative distance is not greater than $r_x$ in FIG. 8, in order to prevent the folding determination process from becoming too complex, but the present invention is also applicable to the case where the relative distance is greater than $r_x$ as shown in FIG. 11. In that case, a second diamond-shaped region similar to the one shown in FIG. 8 is formed above the first diamond-shaped region, and regions A, B, and C are formed in the same manner as in FIG. 8.

In FIG. 11, A3 and A4 correspond to A1 and A2, respectively, B5 and B6 correspond to B1 and B2, respectively, and B7 and B8 correspond to B3 and B4, respectively.

Here, the region B6 is the region into which the lower or higher frequency is folded, and the region B5 is the region into which the lower or higher frequency or both frequencies are folded.

In the region B6, from among the data obtained without folding, the data obtained by folding the lower frequency, and the data obtained by folding the higher frequency, the data that has the smallest error should be employed; on the other hand, in the region B5, from among the above three data plus the data obtained by folding both frequencies, the data that has the smallest error should be employed.

When the upper limit of the relative distance is set to $r_x$, there is no need to consider frequency folding in the regions A1 and A2, but when the upper limit is set to $2r_x$, frequency folding from the region above $r_x$ can enter the region below $r_x$; therefore, in the regions A1, A2, and B1 to B4, there arises a need to determine whether there is any folding from the region above $r_x$.

What is claimed is:

1. A signal processing method for an FM-CW radar which determines a relative distance and a relative velocity with respect to a target from peak frequencies occurring in an upsweep section and a downsweep section of a triangular FM-CW wave wherein, when said target is a target that has previously been detected, predicted values for the peak frequencies currently detected in the upsweep and downsweep sections are computed from the relative distance and relative velocity previously detected with respect to said target, and it is determined whether any of said predicted values exceeds a detection frequency range, and if there is a peak frequency that exceeds said detection frequency range, said frequency is folded and said folded frequency is taken as one of said predicted values, said method then proceeding to search the currently detected peak frequencies to determine whether there are upsweep and downsweep peak frequencies substantially equal to said predicted values, and if said substantially equal frequencies are found, said found frequencies are folded and said folded frequencies are used to determine the relative distance and the relative velocity.

2. A signal processing method for an FM-CW radar as claimed in claim 1 wherein, in the case of a peak frequency for which a predicted value is negative, said predicted value is inverted in sign and taken as one of said predicted values, said method then proceeding to search the currently detected peak frequencies to determine whether there are upsweep and downsweep peak frequencies approximately equal to said predicted values, and if said upsweep and downsweep peak frequencies are found, said found frequencies are inverted in sign and then used to determine the relative distance and the relative velocity.

3. A signal processing method for an FM-CW radar as claimed in claim 1 wherein, in the case of a peak frequency for which a predicted value exceeds an upper limit frequency of said detection frequency range, said peak frequency is folded with respect to said upper limit frequency and said folded peak frequency is taken as one of said predicted values, said method then proceeding to search the currently detected peak frequencies to determine whether there are upsweep and downsweep peak frequencies substantially equal to said predicted values, and if said upsweep and downsweep peak frequencies are found, said found frequencies are folded with respect to said upper limit frequency and said folded peak frequencies are used to determine the relative distance and the relative velocity.

* * * * *